United States Patent [19]
Hicksted et al.

[11] Patent Number: 5,748,874
[45] Date of Patent: May 5, 1998

[54] RESERVED CYLINDER FOR SCSI DEVICE WRITE BACK CACHE

[75] Inventors: Richard L. Hicksted, Incline Village, Nev.; Michael Glaser, Plettenberg, Germany

[73] Assignee: MTI Technology Corporation, Anaheim, Calif.

[21] Appl. No.: 464,101

[22] Filed: Jun. 5, 1995

[51] Int. Cl.$^6$ ........................................... G06F 1/30
[52] U.S. Cl. ........................ 395/182.22; 395/750.08
[58] Field of Search ...................... 395/182.2, 182.22, 395/750, 750.01, 750.07, 750.08

[56] References Cited

U.S. PATENT DOCUMENTS

| | | | |
|---|---|---|---|
| 4,458,307 | 7/1984 | McAnlis et al. | 395/182.2 |
| 5,204,963 | 4/1993 | Noya et al. | 395/750 |
| 5,379,435 | 1/1995 | Hanaoka | 395/750 |
| 5,396,637 | 3/1995 | Harwell et al. | 395/750 |
| 5,519,831 | 5/1996 | Holzhammer | 395/182.2 |
| 5,524,203 | 6/1996 | Abe | 395/182.04 |
| 5,586,334 | 12/1996 | Miyazaki et al. | 395/750 |

*Primary Examiner*—Glenn A. Auve
*Attorney, Agent, or Firm*—Townsend and Townsend and Crew LLP

[57] ABSTRACT

A disk drive in a computer system is equipped with a power storage unit that supplies power to the drive controller when there is a system power interruption, such as a powerdown or a power failure. Once the controller is notified that system power has been interrupted, it will immediately initiate a seek to a reserved location in the disk drive and store the contents of the cache memory at the reserved location. After power has been restored to the system, the controller can load the contents of the reserved cylinders back to the cache memory and complete the pending write operations by writing all of the data items in the cache to their respective final locations in the drive. The present invention has the advantage of requiring a very small amount of power to operate the controller beyond the interruption of system power, since it takes much less power to complete only one write operation of the cache contents to the reserved location, rather than completing the plurality of pending write operations for all the data items in the cache to locations scattered throughout the disk drive.

14 Claims, 2 Drawing Sheets

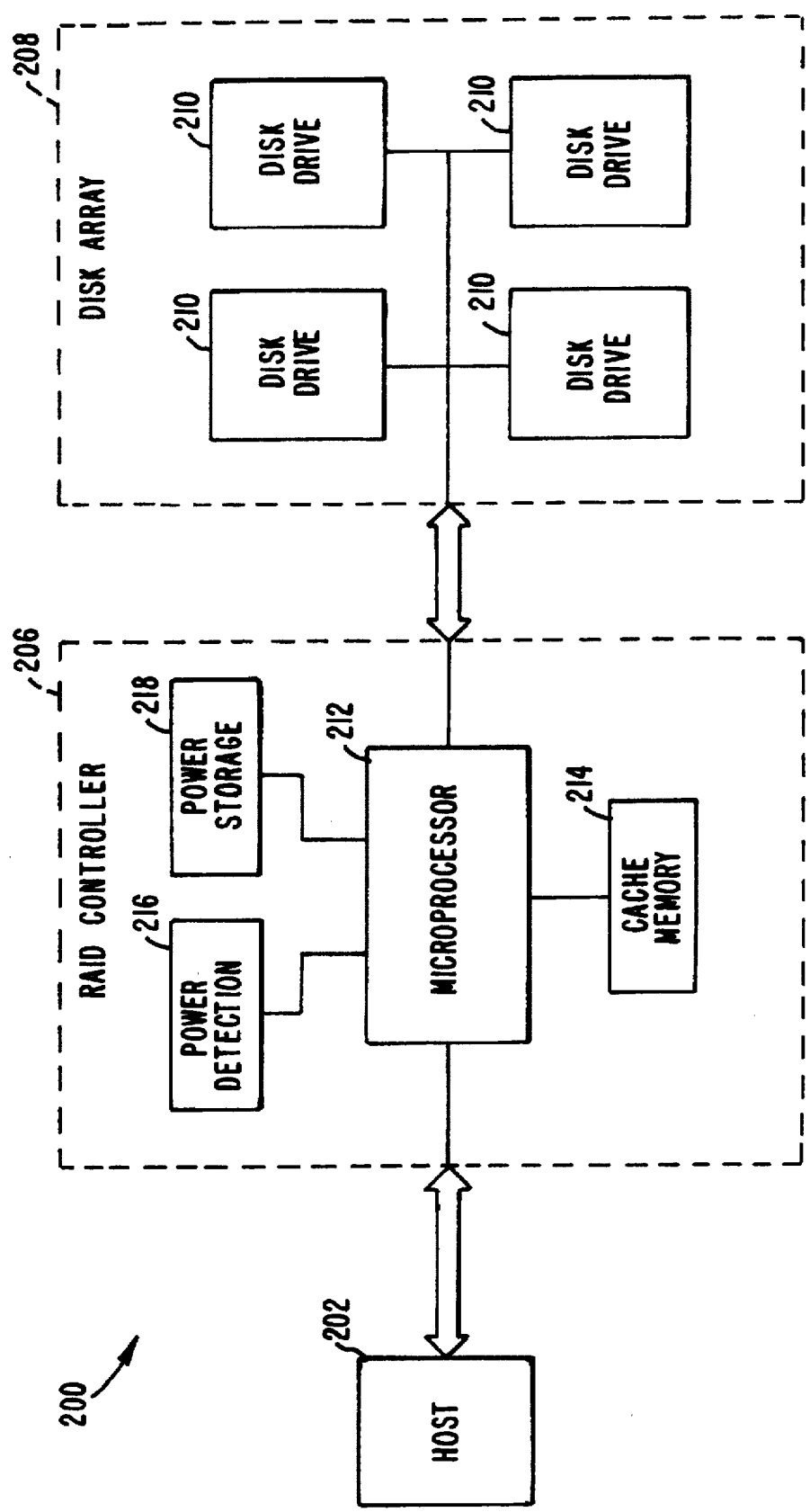

RESERVED CYLINDER FOR SCSI DEVICE WRITE BACK CACHE

BACKGROUND OF THE INVENTION

The present invention relates to a computer system having a write-back cache memory, where a host computer stores data temporarily in cache memory before the data is permanently stored in a disk drive.

In write-back cache systems, when the host initiates a write operation to store data in a disk drive, the host first writes the data to a cache memory. As is well-known in the art, cache memories are typically volatile memories that are much smaller and faster than the non-volatile storage devices used for main system memory, such as, for example, disk drives, tape drives or optical drives. The data is then written from the cache to the disk drive when the memory controller is free to complete the operation. It is often the case that, in order to proceed with subsequent write operations, the host must receive confirmation that the data stored in the cache has been written to the final location in the disk drive. System performance is limited by this requirement, since the host is unable to initiate another write operation until receiving notification of completion of the present write operation.

One method of improving system performance is to offer the option to confirm completion of the write operation to the host immediately after the data has been written to the cache, allowing the host to proceed with subsequent operations. The actual step of writing to the disk drive will then be completed when the memory controller is free. While this method allows the host to operate at a higher speed by initiating write operations more frequently, system reliability suffers. In the event of a system powerdown or a power failure, the contents of the volatile cache memory could be lost before the memory controller has the opportunity to complete the outstanding write operations. The host is then fooled into thinking the data associated with each pending write operation has been updated in the disk drive, when in fact it has not.

It is possible to address the issue of system reliability by adding an external uninterruptable power system, such as a battery-based unit, to the computer system. In the event of a powerdown or power failure, the external power system will enable the memory controller to complete the write operations for all the data still housed in the cache at the time of the system power interruption. This approach becomes prohibitively expensive, though, as the size of a typical cache memory increases, since the increasing number of write operations to be completed by the memory controller requires an increasing amount of time during which power is provided by the external source. Furthermore, adding an external unit to the system could present problems in the physical layout of the computer system, especially since the end user of the system may have to change its features to accommodate the external unit.

Accordingly, it would be desirable to have a computer system where the performance advantages of early write confirmation to the host are secured without the associated reliability and layout problems described above.

SUMMARY OF THE INVENTION

The present invention increases system reliability by reserving a location in the disk drive for storing the contents of the cache memory in the event of a system power interruption. Storage of the image of the cache is done under temporary power provided by a power storage unit that provides sufficient power to the memory controller for limited write operation after system power interruption.

In one embodiment of the present invention, each disk drive in a computer system is equipped with a power storage unit that supplies power to the drive controller when there is a system power interruption, such as a powerdown or a power failure. The power storage unit may be, for example, a battery. Once the controller is notified that system power has been interrupted, it will immediately initiate a seek to a reserved location in the disk drive and store the contents of the cache memory at the reserved location, which may be one or more cylinders on the drive. After power has been restored to the system, the controller can load the contents of the reserved cylinders back to the cache memory and complete the pending write operations by writing all of the data items in the cache to their respective final locations in the drive.

In another embodiment of the present invention, the power storage unit is incorporated in a memory controller which controls an array of disk drives, rather than in each disk drive itself. The invention still operates in the general method outlined above. In this case, once the controller is notified that system power has been interrupted, it will immediately initiate a seek to the reserved locations in the disk drive array and store the contents of the cache memory at the reserved locations, which may be one or more cylinders on one or more of the drives in the array. After power has been restored to the system, the controller can load the contents of the reserved cylinders back to the cache memory and complete the pending write operations by writing all of the data items in the cache to their respective final locations in the drive array.

The present invention has the advantage of requiring a very small amount of power to operate the controller beyond the interruption of system power, since it takes much less power to complete only one write operation of the cache contents to the reserved cylinders, rather than completing the plurality of pending write operations for all the data items in the cache to various locations in the disk drive. Therefore, the power storage unit included in the drive or the memory controller is much smaller and cheaper than the external uninterruptable power systems described above. Also, no additional hardware outside the system is required to implement the present invention, eliminating the need for the end user to change the system configuration.

The invention will be better understood by reference to the following detailed description in connection with the accompanying drawings.

BRIEF DESCRIPTION OF THE DRAWINGS

FIG. 2 shows a block diagram of another embodiment of the present invention where a power storage unit is housed in a memory controller that controls an array of disk drives.

DESCRIPTION OF THE PREFERRED EMBODIMENT

Figure 1:
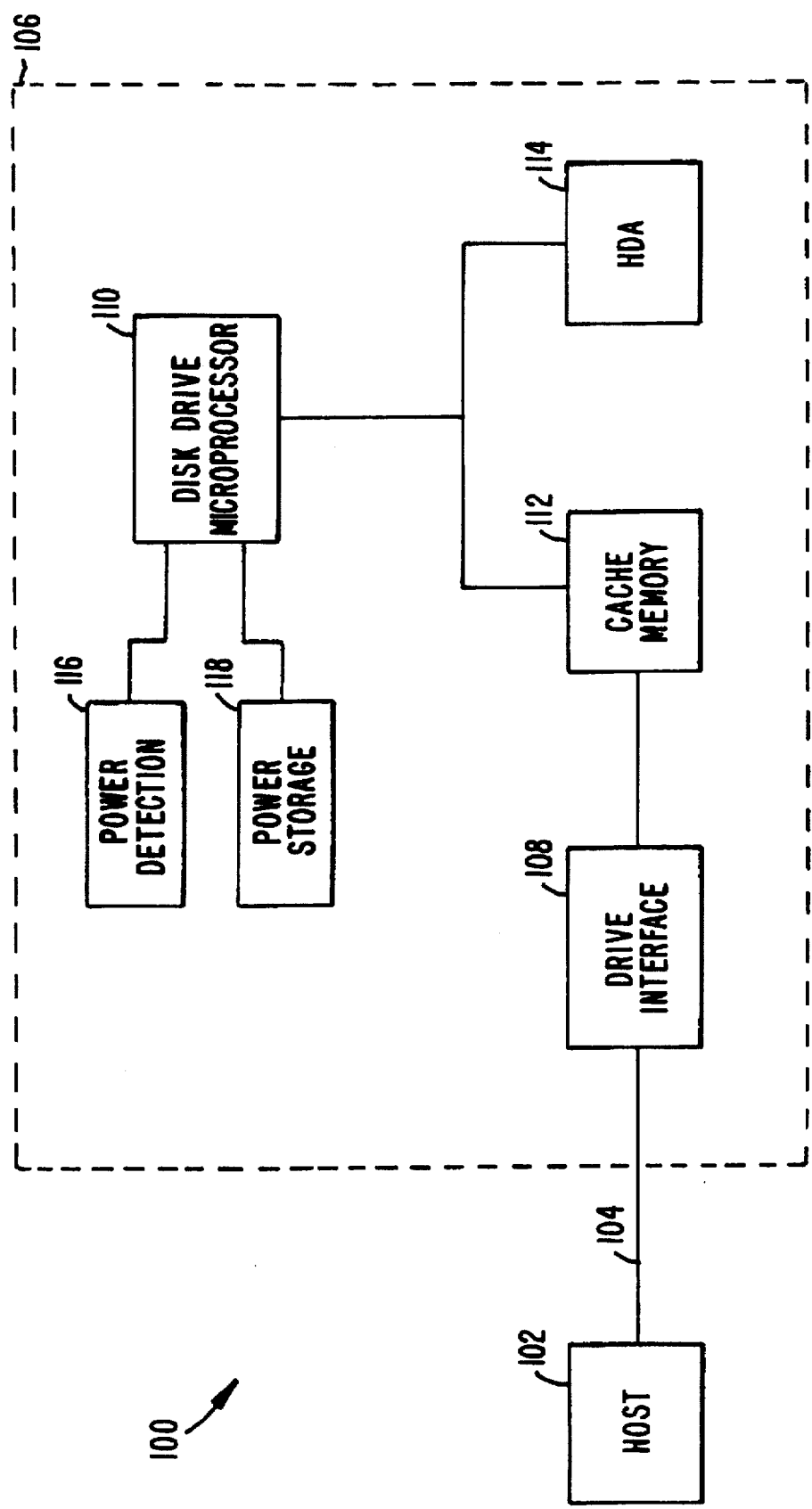
FIG. 1 shows a block diagram of a preferred embodiment of the present invention where a power storage unit is housed in a disk drive.

FIG. 1 shows a simplified block diagram of a computer system 100 where each disk drive comes equipped with a power storage unit for storing an image of the disk cache to a reserved cylinder in the drive. Host computer 102 is connected to other components of the system by a system bus 104. System bus 104 is typically a Small Computer Systems Interface (SCSI) bus, but could be any other bus designed to connect a host to other system components, such as, for example, a Fibre Channel (FC) bus or a Serial SCSI Architecture (SSA) bus. One of the components in the system is a disk drive 106. Drive interface 108 connects the drive to system bus 104. Drive operations are controlled by a microprocessor 110 housed in the disk drive 106. Drive interface 108 is coupled to a disk cache memory 112, which is a volatile memory device. Cache memory 112 is coupled to a head/disk assembly (HDA) 114, the non-volatile storage for computer system 100. Power detection unit 116 and power storage unit 118 are also coupled to processor 110.

In operation, host 102 transfers blocks of data to be stored in disk drive 106 across system bus 104. The data is transferred through drive interface 108 and temporarily stored in cache 112 until processor 110 is free to seek to the cylinder on HDA 114 where the data is to be stored permanently. Because the access times of host 102 and cache 112, both electronic devices, are much faster than the normal seek and rotation time of HDA 114, an electro-mechanical device, numerous write operations accumulate in cache 112 pending final storage in the disk drive. So, in order to free the host 102 to perform other functions, cache 112 sends an early write confirmation back to host 102 immediately after receiving a block of data, even though the data has not actually been written to HDA 114 yet. An early write confirmation will allow the host to proceed with subsequent operations without waiting the additional time until the data is actually stored in the disk drive. Again, when processor 110 is free from handling previous operations, it will seek to the desired cylinder on HDA 114 and store the block of data in the disk drive.

In the event of an interruption of power to the system, power detection circuit 116 will detect the interruption and notify processor 110 that power has been interrupted. Power may be interrupted as a result of, for example, an unanticipated power failure or a normal system powerdown. At this point, after system power interruption, power storage unit 118, which may be, as an example, a battery, provides sufficient power to the microprocessor 110 and HDA 114 for saving the contents of the cache 112. Once processor 110 has received notification of power loss, it will immediately initiate a seek to a reserved location in HDA 114. The reserved location may be one or more cylinders, as long as it is large enough to accommodate the contents of a full cache memory 112. After the seek and rotation to the reserved location is complete, the processor 110 stores the entire contents of cache memory 112 to the reserved cylinders on HDA 114, again under temporary power provided by power storage unit 118. Later, after system power has been restored, the processor 110 can load the contents of the reserved cylinders back to cache memory 112 and complete the pending write operations by writing all of the data blocks in the cache to their respective final locations in HDA 114, in accordance with standard operation.

The data from cache memory 112 written to the reserved cylinders is properly identified so that it may be retrieved upon restoration of system power. For example, one possible identification scheme is to store control information elsewhere on the reserved cylinders in addition to the data which describes where the data is eventually to be written on the disk. An alternative identification scheme is to store control information corresponding to each data block in a predefined area of the data block when the data is stored on the reserved cylinders of HDA 114. The latter scheme offers the advantage of ensuring that control information remains "attached" to its corresponding data block.

Because a minimum number of seeks and rotations are required to position the heads in HDA 114 over the reserved cylinders, the amount of extra power required, and hence the size of power storage unit 118, is minimized. By contrast, if processor 110 were to actually complete all pending write operations to locations scattered throughout the HDA under temporary power, rather than storing an image of the cache 112 at a reserved location, the amount of additional power required beyond system power interruption would be significant, and the size and cost of power storage unit 118 would make it undesirable to include the power storage unit in disk drive 106.

FIG. 2 shows a block diagram of another embodiment of the present invention where a power storage unit is housed in a memory controller that controls a redundant array of independent disks (RAID). Computer systems that include a RAID memory subsystem use one or more arrays of independent magnetic disk drives for system storage. By using an array of smaller disks, rather than a few larger disks, the rate of data transfers between host and disk drives is improved, since the data transfers are distributed among a number of smaller disk drives, rather than being concentrated in one or only a few large drives. In RAID systems, rather than housing a controller on each disk drive unit, a central controller handles operations for all drives in the array. Redundant RAID controllers are described in U.S. Pat. No. 5,212,785, assigned to the assignee of this invention and hereby incorporated by reference.

In FIG. 2, computer system 200 includes a host 202 that is coupled to other system components via system bus 204. As in the embodiment shown in FIG. 1, bus 204 could be any system bus, such as a SCSI, FC or SSA bus. Coupled to the system bus is RAID controller 206, which controls transfers of data between host 202 and storage array 208, which is made up of a plurality of non-volatile disk drives 210. RAID controller 208 includes a microprocessor 212 coupled to a cache memory 214, a volatile memory device. Also coupled to the processor are a power detection circuit 216 and a power storage unit 218.

The operation of the embodiment shown in FIG. 2 is very similar to that of the system shown in FIG. 1. Host 202 transfers blocks of data to be stored in disk array 208 across system bus 204. The data is transferred through RAID controller 206 and temporarily stored in cache 214 until processor 212 is free to seek to the cylinders on disk drives 210 in array 208 where the data is to be stored permanently. Because the access times of host 202 and cache 214, both electronic devices, are much faster than the normal seek and rotation time for disk drives 210, which are electro-mechanical devices, numerous write operations accumulate in cache 214 pending final storage in the disk drive. So, in order to free the host 202 to perform other functions, cache 214 sends an early write confirmation back to host 202 immediately after receiving a block of data, even though the data has not actually been written to disk array 208 yet. An early write confirmation will allow the host to proceed with subsequent operations without waiting the additional time until the data is actually stored in the disk drive. Again, when processor 212 is free from handling previous operations, it will seek to the desired cylinders on the selected disk drives 210 and store the block of data in the disk drive.

In the event of an interruption of power to the system, power detection circuit 216 will detect the interruption and notify processor 212 that power has been interrupted. Power may be interrupted as a result of, for example, an unanticipated power failure or normal system powerdown. At this point, after system power interruption, power storage unit 218, which may be, as an example, a battery, provides sufficient power to the microprocessor 212 and disk array 208 for saving the contents of the cache 214. Once processor 212 has received notification of power loss, it will immediately initiate a seek to a reserved location in disk array 208.

The reserved location may be one or more cylinders, located on one drive or spread across several drives in the array 208, as long as the location is large enough to accommodate a full cache 214. After the seek and rotation to the reserved location is complete, the processor 212 stores the entire contents of cache memory 214 to the reserved cylinders in disk array 208, again, under temporary power provided by power storage unit 218. Later, after system power has been restored, the processor 212 can load the contents of the reserved cylinders back to cache memory 214 and complete the pending write operations by writing all of the data blocks in the cache to their respective final locations in disk array 208, in accordance with standard operation.

As in the embodiment of FIG. 1, because a minimum number of seeks and rotations are required to reach the reserved cylinders, the amount of extra power required, and hence the size of power storage unit 218, is minimized. By contrast, if processor 212 were to actually complete all pending write operations to locations scattered throughout the disk array 208 under temporary power, rather than storing an image of the cache 214 at a reserved location, the amount of additional power required beyond system power interruption would be significant, and the size and cost of power storage unit 218 would make it undesirable to include the power storage unit in RAID controller 206.

The invention has now been explained with reference to specific embodiments. Other embodiments will be apparent to those of ordinary skill in the art upon reference to the present desciption. It is therefore not intending that this invention be limited, except as indicated by the appended claims

What is claimed:

1. In a storage subsystem comprising a microprossor, a cache memory, and a disk drive, a method for storing contents of the cache memory after an interruption of power to the computer system, the method comprising the steps of:
   reserving a location in the disk drive of sufficient size to hold a copy of the contents of the cache memory;
   detecting the interruption of power to the computer system;
   supplying temporary power to the microprocessor and the disk drive after the interruption of power to the computer system;
   seeking to the reserved location in the disk drive under temporary power;
   storing the copy of the contents of the cache memory in the reserved location in the disk drive under temporary power; and
   restoring the copy of the contents of the cache memory stored in reserved location in the disk drive back to the cache memory after a restoration of power to the computer system.

2. The method of claim 1 where in the step of reserving a location in the disk drive further comprises the step of reserving at least one cylinder in the disk drive to store the copy of the contents of the cache memory.

3. The method of claim 1 wherein the step of reserving a location in the disk drive further comprises the step of reserving at least one sector of a cylinder in the disk drive to store the copy of the contents of the cache memory.

4. The method of claim 1 wherein the step of supplying temporary power further comprises providing a battery for supplying temporary power to the microprocessor and disk drive after the interruption of power to the computer system.

5. A storage subsystem for coupling to a host computer, the storage subsystem comprising:
   a microprocessor;
   a cache memory coupled to the microprocessor;
   a power detection circuit coupled to the microprocessor for detecting an interruption of power to the storage subsystem;
   a power storage unit coupled to the microprocessor for supplying temporary power after the interruption of power to the storage subsystem;
   a head/disk assembly coupled to the cache memory having a reserved location of sufficient size for storing a copy of contents of the cache memory under temporary power from the power storage unit after the interruption of power to the computer system; and
   means for restoring the copy of the contents of the cache memory stored in the reserved location in the disk drive back to the cache memory after a restoration of power to the computer system.

6. The storage subsystem of claim 5 wherein the power storage unit comprises a battery.

7. The storage subsystem of claim 5 wherein the reserved location in the head/disk assembly comprises at least one cylinder.

8. The storage subsystem of claim 5 wherein the reserved location in the head/disk assembly comprises at least one sector of a cylinder.

9. The storage subsystem of claim 5 wherein the microprocessor further includes means for storing the copy of the contents of the cache memory to the reserved location in the head/disk assembly.

10. A storage subsystem for coupling to a host computer, the storage subsystem comprising:
    a storage controller comprising:
      a microprocessor;
      a cache memory coupled to the microprocessor;
      a power detection circuit coupled to the microprocessor for detecting an interruption of power to the computer system; and
      a power storage unit coupled to the microprocessor for supplying temporary power to the microprocessor after the interruption of power to the computer system;
    a plurality of disk drives coupled to the storage controller, at least one of the plurality of disk drives having a reserved location of sufficient size for storing a copy of contents of the cache memory under temporary power from the power storage unit after the interruption of power to the computer system; and
    means for restoring the copy of the contents of the cache memory stored in the reserved location in the plurality of disk drives back to the cache memory after a restoration of power to the computer system.

11. The storage subsystem of claim 10, wherein the power storage unit comprises a battery.

12. The storage subsystem of claim 10, wherein the reserved location in the plurality of disk drives comprises at least one cylinder.

13. The storage subsystem of claim 10, wherein the reserved location in the plurality of disk drives comprises at least one sector of a cylinder.

14. The storage subsystem of claim 10, wherein the microprocessor further includes means for storing the copy of the contents of the cache memory to the reserved location in the plurality of disk drives.

* * * * *